(12) United States Patent
Keum

(10) Patent No.: US 11,688,911 B2
(45) Date of Patent: Jun. 27, 2023

(54) BATTERY MODULE AND BATTERY PACK

(71) Applicant: LG CHEM, LTD., Seoul (KR)

(72) Inventor: Jong Yoon Keum, Chungcheongbuk-do (KR)

(73) Assignee: LG Energy Solution, Ltd., Seoul (KR)

(*) Notice: Subject to any disclaimer, the term of this patent is extended or adjusted under 35 U.S.C. 154(b) by 559 days.

(21) Appl. No.: 16/753,662

(22) PCT Filed: Oct. 5, 2018

(86) PCT No.: PCT/KR2018/011800
§ 371 (c)(1),
(2) Date: Apr. 3, 2020

(87) PCT Pub. No.: WO2019/078525
PCT Pub. Date: Apr. 25, 2019

(65) Prior Publication Data
US 2020/0251695 A1 Aug. 6, 2020

(30) Foreign Application Priority Data
Oct. 16, 2017 (KR) ........................ 10-2017-0134146

(51) Int. Cl.
*H01M 50/213* (2021.01)
*H01M 50/24* (2021.01)

(52) U.S. Cl.
CPC ......... *H01M 50/213* (2021.01); *H01M 50/24* (2021.01); *H01M 2220/30* (2013.01)

(58) Field of Classification Search
CPC .... H01M 50/20; H01M 50/24; H01M 50/213; H01M 2220/30
See application file for complete search history.

(56) References Cited

U.S. PATENT DOCUMENTS

| | | |
|---|---|---|
| 2003/0048617 A1 | 3/2003 | Shibata |
| 2005/0164080 A1 | 7/2005 | Kozu et al. |
| 2010/0330404 A1 | 12/2010 | Nishino et al. |
| 2014/0242446 A1 | 8/2014 | Hohenthanner et al. |
| 2015/0042285 A1 | 2/2015 | Doerndorfer |
| 2015/0132629 A1 | 5/2015 | Lee |
| 2015/0214531 A1 | 7/2015 | Sun et al. |
| 2016/0111692 A1 | 4/2016 | Morita et al. |

(Continued)

FOREIGN PATENT DOCUMENTS

| | | |
|---|---|---|
| CN | 104995761 A | 10/2015 |
| CN | 105470413 A | 4/2016 |
| JP | 2001-155789 A | 6/2001 |

(Continued)

OTHER PUBLICATIONS

Takada et al., WO 2017/169728; Espacenet machine translation, 2017 (Year: 2017).*

(Continued)

*Primary Examiner* — Adam A Arciero
(74) *Attorney, Agent, or Firm* — Morgan, Lewis & Bockius LLP

(57) ABSTRACT

Provided are a battery module and a battery pack, i.e., a battery module in which a coupling part is provided so that a creepage distance having a predetermined length is formed in a module case surrounding a battery cell having a side-arranged structure and a battery pack.

8 Claims, 2 Drawing Sheets

(56) References Cited

U.S. PATENT DOCUMENTS

2016/0149177 A1    5/2016    Sugeno et al.
2017/0237045 A1    8/2017    Kim et al.

FOREIGN PATENT DOCUMENTS

| JP | 2003-142049 A | 5/2003 | |
|---|---|---|---|
| JP | 2004-319314 A | 11/2004 | |
| JP | 2006-073268 A | 3/2006 | |
| JP | 2008-047488 A | 2/2008 | |
| JP | 2008-182607 A | 8/2008 | |
| JP | 2010-277696 A | 12/2010 | |
| JP | 2012-134007 A | 7/2012 | |
| JP | 2013-073917 A | 4/2013 | |
| JP | 2014-527262 A | 10/2014 | |
| JP | 2015-011956 A | 1/2015 | |
| JP | 2015-220218 A | 12/2015 | |
| JP | 2015-228286 A | 12/2015 | |
| KR | 2001-0036651 A | 5/2001 | |
| KR | 2003-0023519 A | 3/2003 | |
| KR | 10-2007-0097150 A | 10/2007 | |
| KR | 10-2015-0054545 A | 5/2015 | |
| WO | 2017/169728 A1 | 10/2017 | |
| WO | WO-2017169728 A1 * | 10/2017 | .......... H01M 10/613 |

OTHER PUBLICATIONS

International Search Report issued in corresponding International Patent Application No. PCT/KR2018/011800, dated Apr. 23, 2019.
Extended European Search Report dated Jul. 28, 2020, issued in corresponding EP Patent Application No. 18867895.7.

\* cited by examiner

[Fig.1]
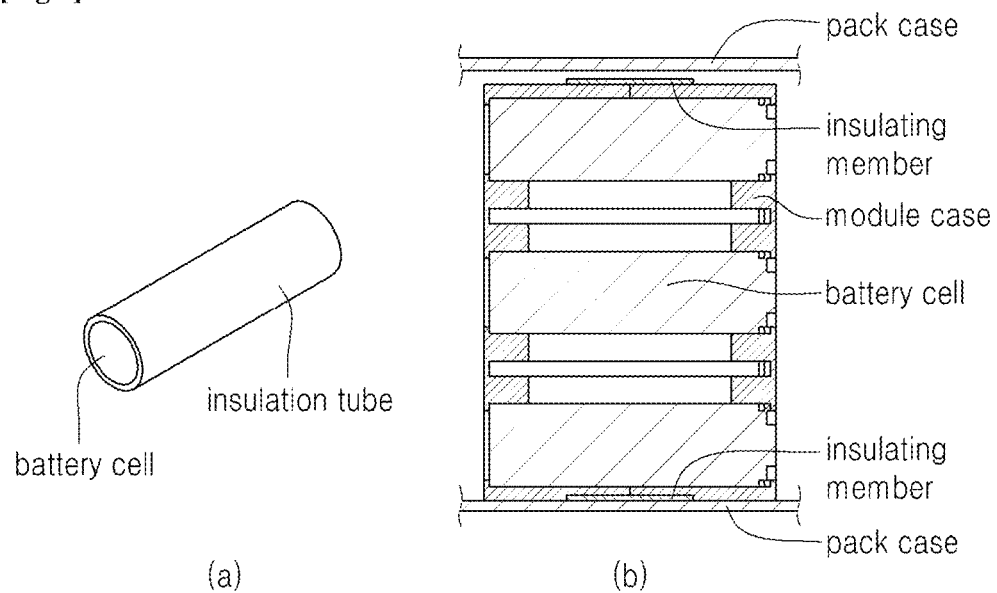
[Fig.2]
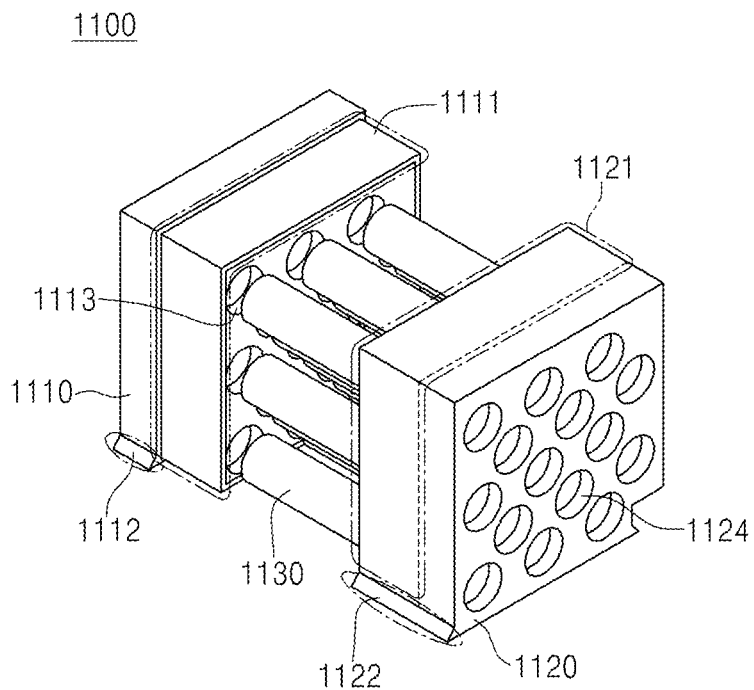

[Fig.3]
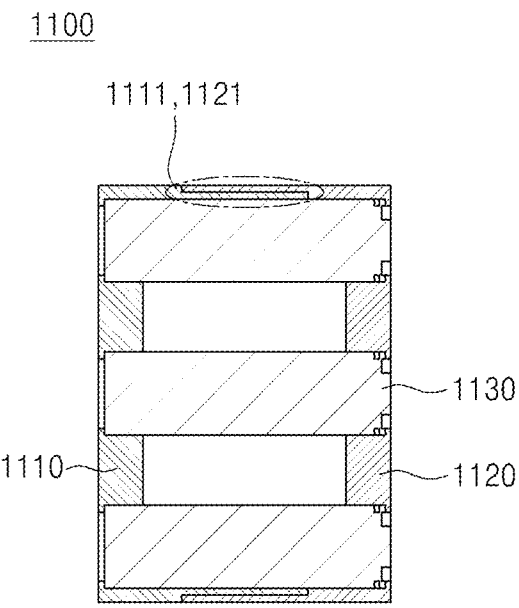
[Fig.4]
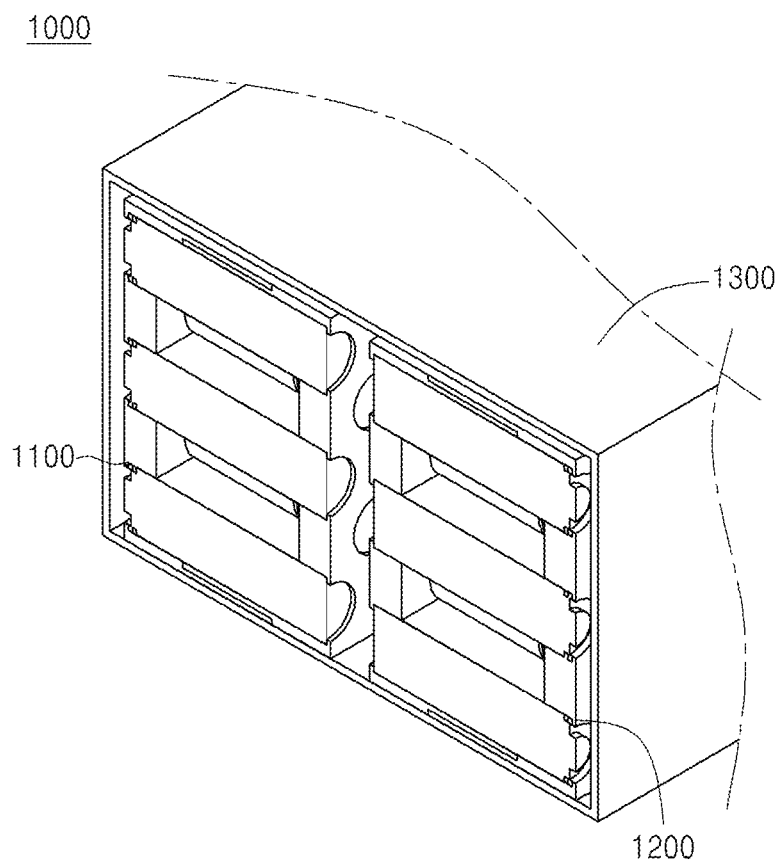

BATTERY MODULE AND BATTERY PACK

BACKGROUND

The present disclosure relates to a battery module and a battery pack, and more particularly, to a battery module in which a coupling part is provided so that a creepage distance having a predetermined length is formed in a module case surrounding a battery cell having a side-arranged structure and a battery pack.

A lithium secondary battery that is a unit cell constituting a battery pack has flexibility and also has a relatively free shape, is lightweight, and has excellent safety, and thus, demand for portable electronic devices such as mobile phones, camcorders, and notebook computers is increasing.

Also, the secondary battery is classified in shape according to a shape of a battery case. When the electrode assembly is built in a cylindrical or prismatic metal can, the secondary battery is classified as a cylindrical battery or a prismatic battery. When the electrode assembly is built in a pouch type case provided as an aluminum lamination sheet, the secondary battery is classified as a pouch type battery.

Also, the electrode assembly built in the battery case includes a positive electrode, a negative electrode, and a separator interposed between the positive electrode and the negative electrode. Thus, the electrode assembly may be chargeable and dischargeable. The cylindrical electrode assembly may be provided in a jelly-roll type in which a positive electrode, a separator, and a negative electrode, each of which has a long sheet shape coated with an electrode active material, are sequentially laminated to be wound.

The above-described battery is classified as one battery cell. A plurality of battery cells are connected in series and/or in parallel to form one module. The plurality of modules may be connected to each other to form one battery pack.

To prevent sparking, which is a cause of ignition of the battery pack, from occurring, a creepage distance having a predetermined length has to be secured. Here, the creepage distance represents the shortest distance which is measured along a surface of an insulating material between conductors.

To solve the above-described limitation, the battery pack in accordance with the related art has to be insulated. Such a solution in accordance with the related art will be described in detail with reference to FIG. 1.

FIG. 1 is a view illustrating a structure of a battery cell and pack in accordance with the related art.

Referring to FIG. 1, FIG. 1-(*a*) illustrates a battery cell to which an insulation tube is applied, and FIG. 1-(*b*) is a side view illustrating a structure of a battery pack in which an insulating member is attached to a module case-coupled portion after a plurality of battery cells are simply disposed in a box-shaped module case.

Since the insulation tube has to be applied to each of the battery cells of FIG. 1-(*a*), a production cost due to a production time and a cost of the insulating tube may increase.

Also, since a creepage distance between the battery cells and the battery pack case of FIG. 1-(*b*) is short (a thickness of the case), the insulating member has to be additionally attached. Thus, the production cost may increase, and thus, the production cost of the insulating member may increase.

Also, as the insulating member is attached, a bottom surface of the module case contacting the pack case is not flat. Thus, to match flatness of the module case, a separate additional constituent is necessary.

Thus, there is a need for a method capable of reducing the production time and production cost of the battery pack by the insulating member.

PRIOR ART DOCUMENTS

Patent Documents (Patent Document 1) KR2007-0097150 A

SUMMARY

The present disclosure provide a battery module and a battery pack in which a production time and a production cost generated when an insulating member is applied or attached to the battery module are reduced.

In accordance with an exemplary embodiment, a battery module disposed in a metallic pack case having electrically conductive characteristics includes: a first module case which has opened one side and on which a first coupling part having a 'ㄴ' shape is disposed on the opened one side; a second module case which has opened one side and on which a second coupling part having a 'ㄱ' shape corresponding to the first coupling part of the first module case is disposed; and a plurality of circular battery cells accommodated in a width direction within the first module case and the second module case, wherein the first coupling part of the first module case is accommodated into the second coupling part of the second module case and then fitted to be coupled to the second coupling part.

Each of the first module case and the second module case may further include a fixing part at a lower portion thereof so that the first module case and the second module case are disposed within the pack case.

The first module case and the second module case may include a plurality of through-grooves communicating with each other in a horizontal direction so that ends of the circular battery cells are inserted to be fixed.

A portion of each of the through-grooves, which meets each of the ends of the circular battery cells inserted into each of the through-grooves, may have a diameter that is less than that of a main body of the circular battery cell.

Each of the first module case and the second module case may be made of an electrically insulating material.

In accordance with another exemplary embodiment, a battery pack includes: a first battery module including a module case in which a plurality of circular battery cells are disposed in a width direction, and a coupling part to which a pair of module cases are fitted and coupled to form a creepage distance having a predetermined length between each of the battery cells and a pack case is provided; a second battery module including a module case in which a plurality of circular battery cells are disposed in a width direction, and a coupling part to which a pair of module cases are fitted and coupled to form a creepage distance having a predetermined length between each of the battery cells and a pack case is provided; and a pack case configured to accommodate the first battery module and the second battery module therein.

In the first battery module and the second battery module, negative (−) electrodes and positive (+) electrodes of the plurality of circular battery cells may be disposed in the same direction so that the positive (+) electrodes of the plurality of circular battery cells within each of the battery modules are disposed to face the pack case.

The pack case may include a plurality of movement prevention parts configured to fix the first battery module and the second battery module to the pack case.

The pack case may be made of a metallic material having electrically conductive characteristics.

Each of the first module case and the second module case may be made of an electrically insulating material.

BRIEF DESCRIPTION OF THE DRAWINGS

Exemplary embodiments can be understood in more detail from the following description taken in conjunction with the accompanying drawings, in which:

FIG. 1 is a view illustrating a structure of a battery cell and pack in accordance with a related art;

FIG. 2 is an exploded perspective view of a battery module in accordance with an exemplary embodiment;

FIG. 3 is a side cutaway view illustrating a structure of the battery module in accordance with an exemplary embodiment; and FIG. 4 is a perspective view of a battery pack in accordance with an exemplary embodiment of the present invention.

DETAILED DESCRIPTION OF EMBODIMENTS

Hereinafter, embodiments of the present invention will be described in detail with reference to the accompanying drawings. However, the present invention is not limited to the embodiments below. Rather, these embodiments are provided so that this disclosure will be thorough and complete, and will fully convey the scope of the present invention to those skilled in the art.

Also, it will be understood that although the ordinal numbers such as first and second are used herein to describe various elements, these elements should not be limited by these numbers. The terms are only used to distinguish one component from other components. For example, a first element referred to as a first element in one embodiment can be referred to as a second element in another embodiment without departing from the scope of the appended claims. In the following description, the technical terms are used only for explaining a specific exemplary embodiment while not limiting the present invention. The terms of a singular form may include plural forms unless referred to the contrary.

While the term used in the present invention selects general terms that are widely used at present in consideration of the functions of the present invention, it is to be understood that this may vary depending on the intention or circumstance of those skilled in the art, the emergence of new technology, and the like. Also, in certain cases, there may be a term chosen arbitrarily by the applicant, and in this case, the meaning thereof will be described in detail in the description of the corresponding invention. Thus, the term used in the present invention should be defined based on the meaning of the term, not on the name of a simple term, but on the entire contents of the present invention.

Embodiment 1

Hereinafter, a battery module in accordance with an exemplary embodiment will be described.

In a battery module in accordance with an exemplary embodiment, a cooling member on which a heater transfer member is disposed to contact both sides thereof may be provided between battery modules constituted by a plurality of battery cells to effectively cool heat generated from the battery cells, thereby maintaining a constant temperature within the battery pack.

FIG. 2 is an exploded perspective view of the battery module in accordance with an exemplary embodiment.

FIG. 3 is a side cutaway view illustrating a structure of the battery module in accordance with an exemplary embodiment.

Referring to FIGS. 2 and 3, a battery module 1100 in accordance with an exemplary embodiment may include a first module case 1110 which is disposed in a metallic pack case having electrical conduction characteristics and has opened one side and on which a first coupling part 1111 having a '⌊' shape is disposed on an end of the opened one side, a second module case 1120 which has opened one side and on which a second coupling part 1121 having a '¬' shape corresponding to the first coupling part of the first module case is disposed, and a plurality of circular battery cells 1130 accommodated in the first module case 1110 and the second module case 1120.

The first coupling part 1111 of the first module case 1110 is accommodated inside the second coupling part 1121 of the second module case 1120 and then is fitted to be coupled to the second coupling part 1121.

A configuration of the battery module 1100 will be described below in more detail.

The one side of the first module case 1110 may be opened, and the first coupling part 1111 having the '⌊' shape may be disposed on the opened one side. Also, the one side of the second module case 1120 may be opened, and the second coupling part 1121 having the '¬' shape corresponding to the first coupling part 111 of the first module case 1110 may be provided on the second module case 1120. Thus, the first module coupling part 1111 and the second coupling part 1121 may be coupled through the fitting.

Also, the first coupling part 1111 and the second coupling part 1121 may be fitted to be coupled to each other so as to secure a predetermined creepage distance between the battery cells 1130 and the pack case, thereby reducing a risk of spark. Here, the creepage distance represents the shortest distance which is measured along a surface of an insulating material between conductors.

Also, it is more efficient to increase the creepage distance by increasing a coupling surface on which the case is bonded, rather than simply increasing the creepage distance by increasing the thickness of the module case. Furthermore, as only a portion of the structure of the case in accordance with the related art is changed, it may be saved more than the cost due to the change of the general case structure.

Thus, each of the first module case 1110 and the second module case 1120 has to be made of an electrically insulation material.

Also, the first coupling part 1111 and the second coupling part 1121 may be coupled to each other in a zigzag shape or may have a shape in which a concave portion is defined in one coupling part, and a convex portion is disposed on the other coupling part as well as the '¬' and '⌊' shapes. Here, the shapes of the first coupling part 1111 and the second coupling part 1121 may be mutually exchanged with each other.

Also, the first module case 1110 and the second module case 1120 may further respectively include fixing parts 1112 and 1122 at lower potions thereof so that the first and second module cases 1110 and 1120 are disposed in the pack case. The fixing part 1112 may have various shapes corresponding to a shape of a fixing part of the pack case.

For example, each of the fixing parts 1112 and 1122 may have a shape that is diagonally spread to a lower end thereof, i.e., may have a triangular shape with a flat and long bottom side. In addition, the fixing part of the pack case corresponding to each of the fixing parts 1112 and 1122 may also have a shape in which the same triangle is inverted so that the fixing parts 1112 and 1122 are slidably coupled to the fixing part of the pack case.

Also, the first module case 1110 and the second module case 1120 may further include a plurality of through-grooves 1113 and 1123 communicating with each other in a horizontal direction so that one end of the circular battery cell is inserted and fixed.

Also, a diameter of a portion of each of the through-grooves 1113 and 1123, which meets an end of the circular battery cell inserted into each of the through-grooves 1113 and 1123, may be less than that of a main body of the circular battery cell so that the battery cell is not discharged to the outside.

However, since a cap of a positive (+) electrode of the battery cell may be opened due to a protection structure of the battery cell, each of the through-grooves 1113 and 1123 may have a diameter equal to or greater than a predetermined diameter range so that the cap of the battery cell is easily opened.

Also, the plurality of circular battery cells 1130 may be accommodated in the first module case 1110 and the second module case 1120 and arranged in a width direction.

Also, electrode terminals of the plurality of circular battery cells 1130 may be arranged in the same one direction so as to easily assembled.

Embodiment 2

Hereinafter, a battery pack in accordance with an exemplary embodiment will be described.

In a battery pack in accordance with an exemplary embodiment, a plurality of battery cells may be arranged in a width direction, and battery modules each of which includes a coupling part that is fitted and coupled to secure a creepage distance having a predetermined length are arranged in two rows so as to be quickly assembled. In addition, negative (−) electrodes of the battery cells provided in each of the battery modules may be arranged to face each other so as to improve cooling efficiency. Thus, the battery pack may be safely driven when the battery pack is driven.

FIG. 4 is a perspective view of a battery pack in accordance with an exemplary embodiment of the present invention.

Referring to FIG. 4, a battery pack 1000 in accordance with an exemplary embodiment includes a first battery module 1100 including a module case in which a plurality of circular battery cells are disposed in a width direction, and a coupling part to which a pair of module cases are fitted and coupled to form a creepage distance having a predetermined length between the battery cell and the pack case is provided, a second battery module 1200 including a module case in which a plurality of circular battery cells are disposed in a width direction, and a coupling part to which a pair of module cases are fitted and coupled to form a creepage distance having a predetermined length between the battery cell and the pack case is provided, and a pack case 1300 accommodating the first battery module 1100 and the second battery module 1200 therein.

Here, although the two battery modules are provided for convenience of description, a plurality of battery modules may extend with respect to each battery module. This means that the battery modules extend in two rows.

Also, a bus bar for electrically connecting the battery modules to each other has to be additionally provided. The bus bar may have various shapes.

A configuration of the battery pack 1000 will be described below in more detail.

Also, each of the first battery module 1100 and the second battery module 1200 includes the module case in which the plurality of circular battery cells are disposed in the width direction, and the coupling part to which the pair of module cases are fitted and coupled to form the creepage distance having the predetermined length between the battery cell and the pack case is provided. Electrodes of the plurality of circular battery cells are disposed in the same direction.

That is, negative (−) electrodes and positive (+) electrodes of the circular battery cells may be disposed in the same direction. Here, the positive (+) electrodes may be disposed to face the pack case 1300.

That is, the positive (+) electrodes of the plurality of battery cells are disposed at a left side of the first battery module 1100, and the negative (−) electrodes of the plurality of battery cells are disposed at a right side of the first battery module 1100.

Also, the negative (−) electrodes of the plurality of battery cells are disposed at a left side of the second battery module 1200, and the positive (+) electrodes of the plurality of battery cells are disposed at a right side of the second battery module 1200.

Also, when the battery cells are driven, heat generated from the electrode terminals through which current flows is greater than that generated from side surfaces of the battery cells. Thus, the electrodes of the battery cells are arranged in a left/right direction (the width direction) that is opened in the atmosphere, not in an upward/downward direction in which a bottom surface is blocked by an object.

More particularly, each of the battery modules includes the first module case including the first coupling part of which an outer edge is cut in a predetermined range to form the creepage distance having the predetermined length, the second module case including the second coupling part that is cut inward in a predetermined range by the same cut size as the first coupling part at a position corresponding to the first coupling part of the first module case, and the plurality of circular battery cells accommodated in the first module case and the second module case.

Here, each of the first module case 1110 and the second module case 1120 may be made of an electrically insulating material to insulate the battery cells from the pack case 1300.

Also, a conductive surface distance (the creepage distance) between the side surface of each of the battery cells and the pack case 1300 may increase by the cut shape of each of the first coupling part and the second coupling part to secure a predetermined length for preventing the spark from occurring.

Also, a cooling module for cooling heat generated in the circular battery cells may be provided between the first battery module 1100 and the second battery module 1200 to easily control a temperature through one constituent, unlike that the cooling modules are provided in each of the battery modules in the related art.

Thus, as the negative (−) electrode terminals of the first and second battery modules 1100 and 1200 are disposed to face each other with respect to a center therebetween, the negative (−) electrodes in which relatively large amount of heat is generated may be disposed on the position at which the cooling module is disposed and thus be more efficiently cooled.

Also, the cooling module includes a first heat transfer frame and a second heat transfer frame, which are respectively disposed adjacent to the first battery module 1100 and the second battery module 1200. A cooling member for cooling heat transferred from the first and second heat transfer frames may be provided between the first and second heat transfer frames, and the first and second heat transfer frames may transfer the heat generated in the battery cells to the cooling member.

The heat transfer frames may directly cool the heat to prevent the battery cells from being deteriorated in performance.

Also, a heating module or a temperature control module (a heating member+a cooling member) in addition to the cooling module may be provided.

Also, the first battery module 1100 and the second battery module 1200 may further respectively include fixing parts 1112 and 1122 at lower potions thereof so that the first and second battery modules 1110 and 1120 are disposed in the pack case 1300. The fixing part 1112 may have various shapes corresponding to a shape of a fixing part of the pack case 1300.

For example, each of the fixing parts 1112 and 1122 may have a shape that is diagonally spread to a lower end thereof, i.e., may have a long triangular shape with a flat bottom side.

Also, the pack case 1300 is accommodated in the first battery module and the second battery module. The pack case 1300 may be made of a metallic material having electrically conductive characteristics to accommodate the plurality of battery modules as well as the first battery module and the second battery module. When the plurality of battery modules are accommodated in the pack case 1300, the pack case 1300 may be provided as a case made of the metallic material because the pack case 1300 has a large weight to bear.

Also, the pack case 1300 may include a plurality of movement prevention parts for fixing the first battery module and the second battery module to the pack case. This is done for preventing explosion from being spread to another battery cell or module when ignition occurs in one battery cell.

Also, when the battery module is fixed to allow a device on which the corresponding battery pack is mounted to move, the movement occurring in the battery module may be prevented.

Also, each of the movement prevention parts may have various shapes. The movement prevention part may be provided in the form of a block that fills a gap to prevent the battery module case from moving or provided in the form of a partition wall for partitioning the cells or the modules.

Also, the inside of a bottom surface of the pack case 1300 may contact the battery modules 1100 and 1200. Here, a shape corresponding to each of the fixing parts 1112 and 1122 of the battery module 1100 and 1200 may be provided on an end of the surface contacting each of the battery modules 1100 and 1200.

For example, each of the fixing parts 1112 and 1122 may have a shape that is diagonally spread to a lower end thereof, i.e., may have a triangular shape with a flat and long bottom side. In addition, the fixing part of the pack case 1300 may also have a shape in which the same triangle is inverted so that the fixing parts 1112 and 1122 are slidably coupled to the fixing part of the pack case 1300.

The battery module in accordance with the exemplary embodiment of the present invention may be easily manufactured without large deformation in the form of the battery module case so that the separate production cost by the insulating member is not added, and the battery module is quickly produced while securing the predetermined creepage distance to quickly and cheaply produce the battery pack.

As described above, the technical idea of the present invention has been specifically described with respect to the above embodiments, but it should be noted that the foregoing embodiments are provided only for illustration while not limiting the present invention. Various embodiments may be provided to allow those skilled in the art to understand the scope of the preset invention, but the present invention is not limited thereto.

What is claimed is:

1. A battery module disposed in an electrically conductive metallic pack case, the battery module comprising:
    a first module case having an opened side and on which a first coupling part having 'L' shape is disposed on the opened one side, the first coupling part has a proximal portion and a distal portion such that a thickness of the proximal portion is greater than a thickness of the distal portion, wherein an inner surface of the first coupling portion is flat, and an outer surface of the first coupling portion defines a step between the proximal and distal portions of the first coupling part;
    a second module case having an opened side and on which a second coupling part having '¬' shape corresponding to the first coupling part of the first module case is disposed, the second coupling part has a proximal portion and a distal portion such that a thickness of the proximal portion is greater than a thickness of the distal portion, wherein an outer surface of the second coupling portion is flat, and an inner surface of the second coupling portion defines a step between the proximal and distal portions of the second coupling part; and
    a plurality of circular battery cells accommodated in a width direction within the first module case and the second module case,
    wherein the first coupling part of the first module case is accommodated into and fitted to be coupled to the second coupling part of the second module case such that the distal portions of the first and second coupling parts overlap to form a creepage distance therethrough having a predetermined length between each of the battery cells,
    wherein the distal portion of the first module case abuts the proximal portion of the second module case to define a flat inner surface therebetween, and the distal portion of the second module case abuts the proximal portion of the first module case to define a flat outer surface therebetween,
    wherein the first module case and the second module case comprise a plurality of through-grooves communicating with each other in a horizontal direction so that ends of the circular battery cells are inserted to be fixed, and
    wherein a portion of each of the through-grooves, which meets each of the ends of the circular battery cells inserted into each of the through-grooves, has a diameter that is less than that of a main body of the circular battery cell.

2. The battery module of claim 1, wherein each of the first module case and the second module case further comprises a fixing part at a lower portion thereof so that the first module case and the second module case are disposed within the pack case.

3. The battery module of claim 1, wherein each of the first module case and the second module case includes an electrically insulating material.

4. A battery pack, comprising:
- a first and a second battery module according to claim 1; and
- a pack case configured to accommodate the first battery module and the second battery module therein.

5. The battery pack of claim 4, wherein, in the first battery module and the second battery module, negative (−) electrodes and positive (+) electrodes of the plurality of circular battery cells are disposed in the same direction so that the positive (+) electrodes of the plurality of circular battery cells within each of the battery modules are disposed to face the pack case.

6. The battery pack of claim 4, wherein the pack case comprises a plurality of movement prevention parts configured to fix the first battery module and the second battery module to the pack case.

7. The battery pack of claim 4, wherein the pack case includes an electrically conductive metallic material.

8. The battery pack of claim 4, wherein each of the first module case and the second module case includes an electrically insulating material.

\* \* \* \* \*